(12) United States Patent
Squires et al.

(10) Patent No.: US 12,337,312 B2
(45) Date of Patent: Jun. 24, 2025

(54) MICROFLUIDIC DISPENSERS FOR LIMITING DILUTION

(71) Applicant: Hewlett-Packard Development Company, L.P., Spring, TX (US)

(72) Inventors: Erica Midttveit Squires, Corvallis, OR (US); Roberto A. Pugliese, Corvallis, OR (US); Kenneth Ward, Corvallis, OR (US); Kathryn H. Cyr, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 757 days.

(21) Appl. No.: 17/603,412

(22) PCT Filed: Oct. 10, 2019

(86) PCT No.: PCT/US2019/055545
§ 371 (c)(1),
(2) Date: Oct. 13, 2021

(87) PCT Pub. No.: WO2021/071491
PCT Pub. Date: Apr. 15, 2021

(65) Prior Publication Data
US 2022/0184601 A1    Jun. 16, 2022

(51) Int. Cl.
*B01L 3/02*    (2006.01)
(52) U.S. Cl.
CPC ..... *B01L 3/0293* (2013.01); *B01L 2200/0605* (2013.01); *B01L 2200/0642* (2013.01); *B01L 2200/16* (2013.01)

(58) Field of Classification Search
CPC .......... B01L 3/0293; B01L 2200/0605; B01L 2200/0642; B01L 2200/16
See application file for complete search history.

(56) References Cited

U.S. PATENT DOCUMENTS

| 8,789,924 B2 | 7/2014 | Bibl et al. |
| 9,050,592 B2 | 6/2015 | Still et al. |
| 2004/0115830 A1 | 6/2004 | Touzov |

(Continued)

FOREIGN PATENT DOCUMENTS

| RU | 2630667 | 9/2017 |
| WO | 2010118637 | 10/2010 |
| WO | 2018073283 | 4/2018 |

OTHER PUBLICATIONS

Gross et al., Technologies for Single-Cell Isolation, International Journal of Molecular Sciences, ISSN 1422-0067, 2015, pp. 16897-16919.

(Continued)

*Primary Examiner* — Jill A Warden
*Assistant Examiner* — Alex Ramirez
(74) *Attorney, Agent, or Firm* — Foley & Lardner LLP

(57) ABSTRACT

A microfluidic dispenser can include a processor to receive a user input via a user interface related to limiting dilution (or a limiting dilution assay) to be performed, and calculate a dispense volume of a fluid for the limiting dilution based on the user input. The microfluidic dispenser can also include a dispense cassette including a fluid reservoir, and a microfluidic dispense head to dispense the fluid via a nozzle in accordance with the calculated dispense volume.

14 Claims, 3 Drawing Sheets

(56) References Cited

U.S. PATENT DOCUMENTS

| | | | | |
|---|---|---|---|---|
| 2004/0219688 A1* | 11/2004 | Churchill | ........... | G01N 35/1002 |
| | | | | 436/180 |
| 2014/0248621 A1* | 9/2014 | Collins | ................ | C12N 5/0696 |
| | | | | 435/6.12 |
| 2019/0134623 A1* | 5/2019 | Day | ................... | G01N 35/1002 |

OTHER PUBLICATIONS

Schoendube et al., Single-cell printing based on impedance detection, Biomicrofluidics, vol. 9, 2015, 10 pages, XP55575870.

* cited by examiner

MICROFLUIDIC DISPENSERS FOR LIMITING DILUTION

BACKGROUND

Microfluidic dispensing systems have applicability within a wide range of industries, including pharmaceutical, life science research, medical, printing, electronics manufacturing, and other industries. Manual fluid dispensing systems such as pipettes are increasingly being replaced by automated pipetting or microfluidic dispensing systems that can provide a high degree of accuracy and repeatability with improved dispense throughput. Industries can employ such automated, precision microfluidic dispensing systems for a variety of purposes, including for the preparation of biological and pharmaceutical assays, the delivery of fluid ink drops to various print media, the dispensing of adhesive materials in an accurate and repeatable manner, and so on.

DETAILED DESCRIPTION

Figure 1:
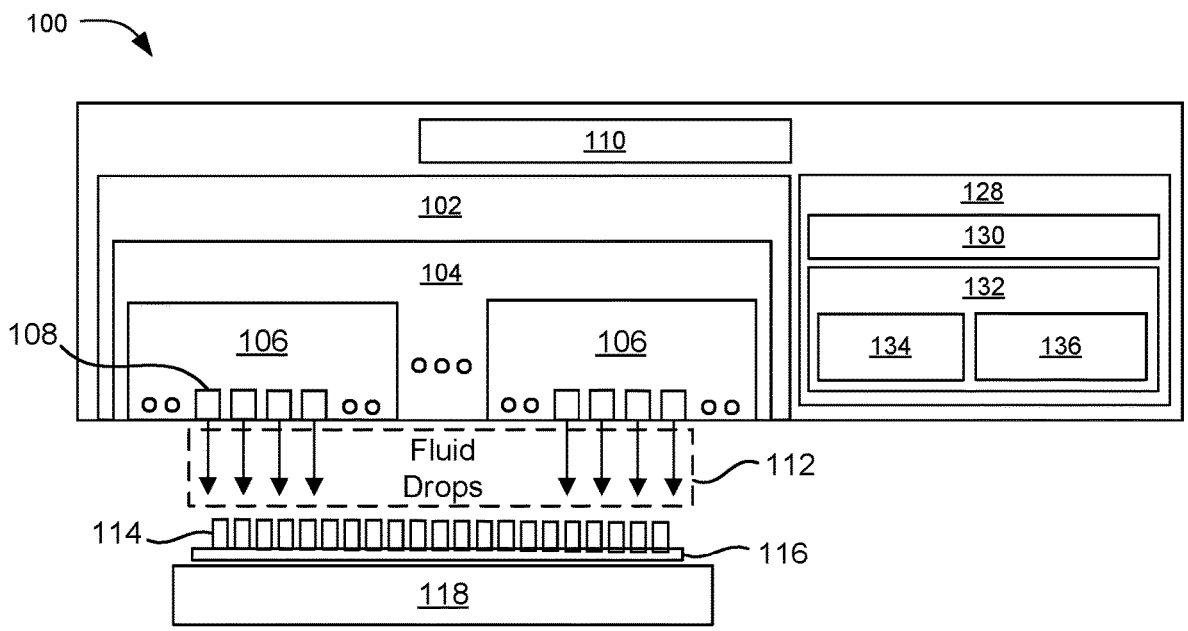
FIG. 1 illustrates an example microfluidic dispenser to calculate a dispense volume of a fluid for limiting dilution based on a user input and dispense the fluid in accordance with the calculated dispense volume in accordance with the present disclosure.

The present disclosure describes a system, a method, and a machine readable storage medium related to a microfluidic dispenser for performing limiting dilution. In one example, a microfluidic dispenser includes a processor to receive a user input via a user interface related to limiting dilution to be performed, and calculate a dispense volume of a fluid for the limiting dilution based on the user input. The system also includes a dispense cassette including a fluid reservoir, and a microfluidic dispense head to dispense the fluid via a nozzle in accordance with the calculated dispense volume. In one example, the fluid includes a cell-containing fluid dispersion, and the dispense volume can be calculated for the fluid is associated with an increased chance of dispensing a single cell in the dispense volume. In another example, the fluid includes a cell-containing fluid dispersion, and the user input relates to the limiting dilution includes a cell concentration, a substrate type to receive the fluid from the dispense cassette, a cell dispersion level, a cell type or size, a dispense pattern, a number of substrates that are to receive the fluid from the dispense cassette, or a combination thereof. In further detail, the fluid travels from the fluid reservoir through a chamber of the microfluidic device and exit through the nozzle located at an end of the chamber. The chamber includes a resistive heating element that receives a current and causes the fluid to be ejected out of the chamber through the nozzle. The microfluidic dispense head includes multiple nozzles that operate non-simultaneously to dispense the fluid. The microfluidic dispense head includes multiple microfluidic paths, and a given microfluidic path in the multiple microfluidic paths may have size dimensions based on a cell size used to perform the limiting dilution. The system also further includes a substrate to receive the fluid from the nozzle, such as a well-plate, a microscope slide, agar, hydrogel, petri dish, nitrocellulose or polydimethylsiloxane (PDMS).

In another example, a method of making a microfluidic dispenser includes assembling a processor and a dispense cassette to form the microfluidic dispenser, wherein the dispense cassette includes a fluid reservoir and a microfluidic dispense head. The method further includes configuring the processor to receive via a user interface a user input related to limiting dilution to be performed using the microfluidic dispenser, and to calculate a dispense volume of a fluid for the limiting dilution based on the user input. In further detail, the method also includes configuring the microfluidic dispense head to dispense the fluid via a nozzle in accordance with the calculated dispense volume. In one example, the fluid can be a cell-containing fluid dispersion and the calculated dispense volume of the fluid can be associated with an increased likelihood of achieving a one-cell dispense for the limiting dilution. In another example, the fluid can be a cell-containing fluid dispersion and the user input related to the limiting dilution can include a cell concentration, a substrate type to receive the fluid from the microfluidic dispense head, a cell dispersion level, a cell type or size, a pattern of dispense, a number of substrates that are to receive the fluid from the microfluidic dispense head, or a combination thereof.

In another example, a machine readable storage medium includes instructions that, when executed by a processor, cause the processor to receive a user input via a user interface related to limiting dilution to be performed using a microfluidic dispenser, calculate a dispense volume of a fluid for the limiting dilution based on the user input, and instruct a microfluidic dispense head of the microfluidic dispenser to dispense the fluid via a nozzle in accordance with the calculated dispense volume. In one example, the fluid can be a cell-containing fluid dispersion, and the calculated dispense volume of the fluid can be associated with an increased likelihood of achieving a one-cell dispense for the limiting dilution. In another example, the fluid can be a cell-containing fluid dispersion, and the user input related to the limiting dilution can include a cell concentration, a substrate type to receive the fluid from the microfluidic dispense head, a cell dispersion level, a cell type or size, a pattern of dispense, a number of substrates that are to receive the fluid from the microfluidic dispense head, or a combination thereof.

In these examples, it is noted that when discussing the system, the method, or the machine readable storage medium, any of such discussions can be considered applicable to the other examples, whether or not they are explicitly discussed in the context of that example. Thus, for example, in discussing details about a microfluidic dispenser, such discussion also relates to the methods and machine readable storage mediums described herein, and vice versa.

In one example, a microfluidic dispenser can be an instrument designed to dispense picoliter quantities of biological fluids into well-plates, or other vessels, using disposable dispense cassettes. A dispense cassette can contain microfluidic dispense head(s) (or print heads), where a given microfluidic dispense head is equipped with inkjet technology and can be specifically designed for laboratory research.

In one example, the microfluidic dispenser can be capable of dispensing eukaryotic cells, as well as aqueous-based biomolecules, in bulk fashion. This capability can be leveraged to perform limiting dilution assays. "Limiting dilution" or "limiting dilution assay" can be defined as the use of dispensing system to create a known amount of a substance contained in a mixture by sequentially diluting the mixture with a fluid not containing the substance. For example, cells within a fluid sample can be diluted to a point where a desired number of cells on average is contained in the dilution. In one example, limiting dilution can be utilized to isolate single cells. In further detail, a limiting dilution assay is a laboratory technique that may be used to obtain a monoclonal (one) cell population from a concentrated cell solution and is a more precise alternative to a traditional bulk cell dispense. Applications of limiting dilution can include cell line development, drug discovery with an emphasis in the cancer and immunology fields, and research into the understanding of fundamental cellular biology and regulation.

The technology herein describes a mechanism in which a microfluidic dispenser can automatically perform limiting dilution calculations and dispense a high yield of single-cell containing wells, for example, saving researchers time, effort, and money based on the high accuracy of the low-volume dispenses of the microfluidic dispenser.

In one example, limiting dilution can be performed using fluorescence assisted cell sorting (FACS) or by hand-pipetting. However, FACS instruments use increased amounts of fluid per test, whereas the microfluidic dispenser described herein can dispense a single cell using about 1 nL of stock cell solution. As cells are jetted using the microfluidic dispenser described herein, the cells can experience less shear stress as compared to FACS. Shear stress has a negative impact on cells by compromising the cell membrane leading to reduced cell viability of dispensed single cells. Further, the user interface of the microfluidic dispenser described herein is simpler as compared to FACS instruments, and uses less preparatory work and training to complete a limiting dilution assay as compared to FACS. Furthermore, performing a limiting dilution assay with a hand pipette is slower and uses an increased amount of fluid as compared to using the microfluidic dispenser described herein. For example, the microfluidic dispenser described herein can perform a limiting dilution assay in a 384 well-plate in less than 3 minutes in a number of cases, while a same assay could take ten times as long if performed by hand with a multi-channel pipette. A contributing factor for the increased time for hand-pipetting is that a starting stock cell solution for limiting dilution by hand-pipette is to be lower than when performed by the microfluidic dispenser described herein, which equates to increased preparatory work. Therefore, poor yield and large time consumption for hand pipette and FACS solutions have driven the search for a quicker, more cost-effective manner to complete limiting dilution assays.

The technology described herein for performing limiting dilution can be more efficient in terms of the amount of fluid used as compared to other solutions. For example, the microfluidic dispenser described herein can be an order of magnitude or multiple orders of magnitude, e.g., 500 times or more, more efficient in terms of the amount of fluid used than FACS when performing limiting dilution in some instances. The microfluidic dispenser described herein can use less fluid/labware. For example, traditional limiting dilution techniques work in milliliter quantities, whereas the microfluidic dispenser described herein can work in picoliter quantities. The microfluidic dispenser described herein can have an increased rate of cell viability, as lower shear stress on cells jetted through the microfluidic dispense head of the microfluidic dispenser can lead to higher cell viability. Further, the microfluidic dispenser described herein can automatically perform limiting dilution calculations after certain input characteristics (e.g., fluid characteristics) are inputted by a user.

In one example, an operator can use a hand pipette to dispense a cell-containing fluid sample into a fluid reservoir of a microfluidic dispense head located in the microfluidic dispenser. The fluid can travel through a chamber of the microfluidic dispense head, and can exit through a nozzle located at an end of the chamber. An inkjet firing system can be used to dispense individual droplets and drive fluid movement forward through the microfluidic dispense head. The microfluidic dispenser can automatically perform limiting dilution calculations to determine an optimal number of drops to jet to have an increased probability of achieving a one cell dispense. The microfluidic dispenser can be designed in such a way that cells may be dispensed onto a variety of substrates, such as well-plates and microscope slides, agar, hydrogel, petri dishes, nitrocellulose, polydimethylsiloxane (PDMS), etc. Other substrates can also be used that would be useful for receiving fluid dispensed from the nozzle or nozzles which would be likewise beneficial for similar applications. A mechanism for moving the substrate relative to the microfluidic dispense head can be included so that single cells can be dispensed into specific areas.

In one example, in which the microfluidic dispenser including a bulk cell cassette is used to perform the limiting dilution, an operator can input a concentration of cells in a stock cell solution. The microfluidic dispenser can use the concentration, as well as a drop volume automatically detected from the cassette used, to calculate a number of drops to fire out of a single nozzle to dispense one cell onto an area of interest. Next, a stage mechanism on the microfluidic dispenser can reposition the substrate (or vessel) under the firing nozzle to perform a next dispense event.

In another example, a user of the microfluidic dispenser can input an amount of cell dispersion, or an amount of cell clumping, prior to performing an assay. When there is no over-dispersion in a cell sample, individual cells can be about equidistant from one another. Over-dispersion in the sample can be indicative of some cell clumping, which can lower a statistical probability of dispensing a single cell onto the substrate. The inputted dispersion can be used by the microfluidic dispenser to refine the limiting dilution calculations and alter the number of drops to fire out of the microfluidic dispense head to provide an increased probability of dispensing one cell onto the area of interest.

In another example, the calculated number of drops can be fired out of multiple single nozzles of the microfluidic dispense head during one limiting dilution assay. In this example, multiple nozzles may not be firing at once, but can be firing one at a time throughout the assay. Microfluidic dispense heads, when jetting cell solutions, can be prone to issues such as kogation and clogging, both of which could potentially prevent the dispensing of subsequent cells and cause the limiting dilution assay to end prematurely. The microfluidic dispense head can be configured to switch which nozzle is firing in order to extend the life of the microfluidic dispense head.

In one example, an ability to switch dispensing to different nozzles can be important when the user is planning to perform a multi-substrate dispense, which would necessitate a long nozzle life. Thus, the ability for the microfluidic dispense head to switch between nozzles would increase the amount of well-plates the user could perform limiting dilution during in a single assay, which also increases the number of single cells obtained. As an alternative to switching the nozzles in the microfluidic dispense head, the microfluidic dispenser can prompt the user to change microfluidic dispense heads or cassettes during the assay, which would allow for multiple different fluids or cell solutions to be dispensed out of a given microfluidic dispense head during a single assay, as well as fluidic layering of the solutions.

In one example, a traditional bulk cell cassette can have multiple fluidic paths, where a given fluidic path can contain a chamber and a nozzle. In the microfluidic dispenser described herein, a fluidic path of a microfluidic dispense head can have unique dimensions as compared to other fluidic paths of the microfluidic dispense head, where the unique dimensions can be based on a cell size used to perform limiting dilution. Therefore, an operator or user can input the cell size, and the microfluidic dispenser can automatically select a fluidic path corresponding to the cell size inputted from the operator or user. In this case, the microfluidic dispense head can fire through this fluidic path's nozzle during the assay, and not through other fluidic paths corresponding to other cell sizes.

In one example, the microfluidic dispenser described herein can utilize single-print head cassettes or multiple print heads. In the latter instance, the operator or user can manually change microfluidic dispense heads, instead of the microfluidic dispenser automatically switching microfluidic dispensers, as described above.

Figure 2:
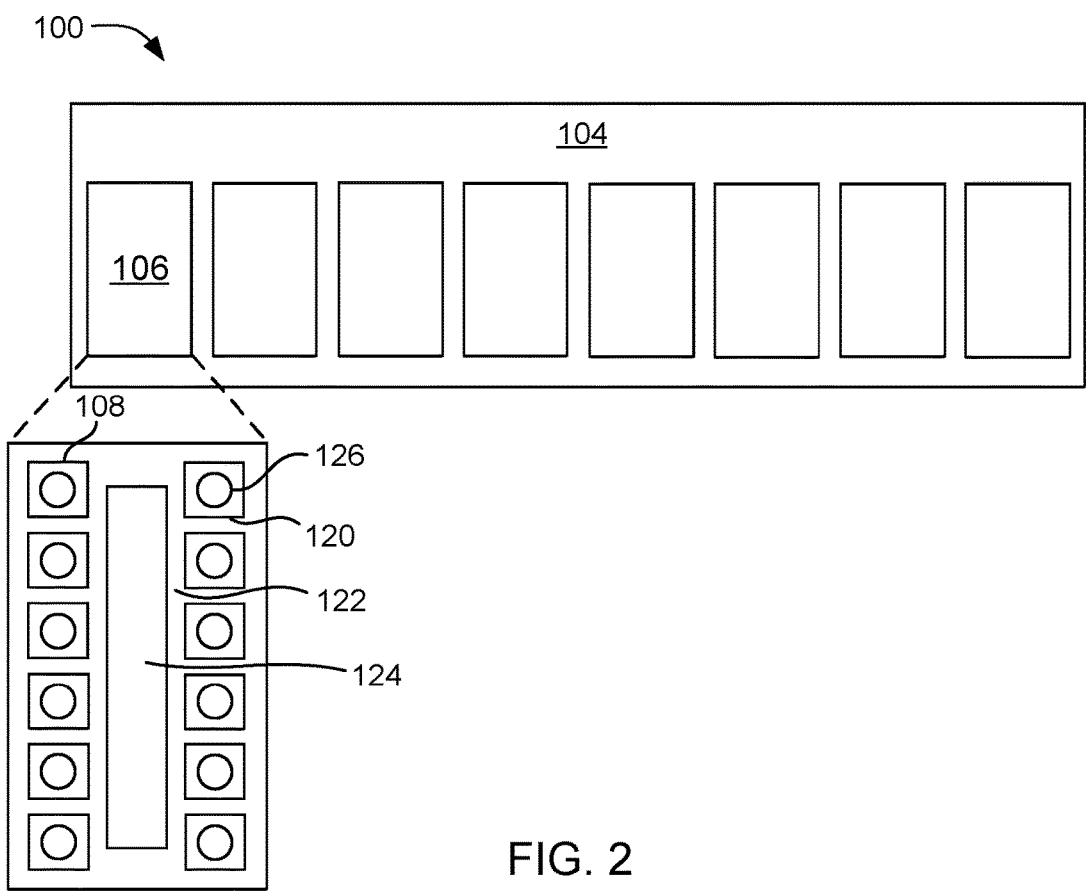
FIG. 2 illustrates an example dispense cassette of a microfluidic dispenser in accordance with the present disclosure.

Turning now to the FIG. 1 and FIG. 2. a microfluidic dispenser 100 (which may be described alternatively as a microfluidic dispensing system) suitable for performing limiting dilution is shown specifically in FIG. 1. While the microfluidic dispenser is illustrated and described herein in terms of a microfluidic dispenser useful in pharmaceutical, biological, and other life science research, for example, in testing drug dose responses, independent titrations, and for other low-volume dispensing, it is to be understood that the described mechanisms and concepts can apply in a similar manner to other fluid dispensing devices.

The microfluidic dispenser 100 can include a receiving station 102 to receive a microfluidic dispense head(s) 106 with an ejection nozzle(s) 108. As shown in FIG. 1, in some specific examples, a receiving station can receive a dispense cassette 104 that includes multiple microfluidic dispense heads. An example dispense cassette can include multiple microfluidic dispense heads arranged in parallel across the length of the dispense cassette. Different dispense cassettes can include different types of microfluidic dispense heads. The types of microfluidic dispense heads that may be integrated onto the dispense cassette can be identified by the microfluidic dispenser through a dispense cassette reader that can read a cassette identifier on the dispense cassette.

FIG. 2 shows an example of the dispense cassette 104 that includes eight microfluidic dispense heads 106 suitable for use in the microfluidic dispenser 100, as shown in FIG. 1. Individual microfluidic dispense heads can include a fluid reservoir 124 into which fluid can be added for dispensing through the ejection nozzle(s) 108. In different examples, a microfluidic dispense head can implement different ejection technologies to dispense fluid drops. For example, in a thermal drop-on-demand ejection process, a microfluidic dispense head can include a series of dispense chambers 126, individual dispense chambers containing a resistive heating element 120, and individual dispense chambers being associated with a corresponding ejection nozzle(s) 108. The individual dispense chambers can be in fluidic communication with the fluid reservoir via a microfluidic channel 122. A fluid drop can be dispensed or ejected from a dispense chamber by passing a current through the resistive heating element. The current heats the resistive heating element, causing rapid vaporization of fluid around the element and forming a vapor bubble that generates a pressure increase that ejects a fluid drop out of the chamber through the ejection nozzle.

In a piezoelectric drop-on-demand fluid ejection process, a microfluidic dispense head(s) 106 can include a piezoelectric material associated with the individual dispense chambers 126. The piezoelectric material changes shape when a voltage is applied, and the change in shape generates a pressure pulse in the fluid within the dispense chamber that forces a drop of fluid out of the chamber through the ejection nozzle(s) 108. A microfluidic dispense head and its various components and structures can be manufactured using assorted microfabrication techniques including microlithography, thin film construction, etching, bonding, and so on.

Referring again to FIG. 1, an example microfluidic dispenser 100 can be used as part of a system which includes a well plate 116, includes numerous wells 114 for example, into which fluid drops can be dispensed from the microfluidic dispense head(s) 106 of the dispense cassette 104. A well plate transport assembly 118 can position and reposition the well plate and wells relative to the dispense heads as fluid droplets are being dispensed. Thus, a fluid dispense zone 112 is defined adjacent to the ejection nozzles 108 in an area between the dispense heads and the wells on the well plate.

Furthermore, an example microfluidic dispenser 100 can include a controller 128. The controller can control various operations of the microfluidic dispenser for facilitating, for example, calculating a dispense volume 136 of a fluid for the limiting dilution based on a user input 134, as well as instructing the fluid to be dispensed from the microfluidic dispense head(s) 106 in accordance with the calculated dispense volume. As shown in FIG. 1, the controller can include a processor (CPU) 130 and a memory 132. The controller may additionally include other electronics (not shown) for communicating with and controlling various components of the microfluidic dispenser. Such other electronics can include, for example, discrete electronic components and/or an ASIC (application specific integrated circuit). The memory can include both volatile (i.e., RAM) and nonvolatile memory components (e.g., ROM, hard disk, optical disc, CD-ROM, magnetic tape, flash memory, etc.). The components of the memory include non-transitory, machine-readable (e.g., computer/processor-readable) media that can provide for the storage of machine-readable coded program instructions, data structures, program instruction modules, JDF (job definition format), and other data and/or instructions executable by the processor of the microfluidic dispenser 100.

In one example, the controller 128 can, using the processor 130, receive the user input 134 via a user interface 110 related to limiting dilution to be performed using the microfluidic dispenser 100. The user interface can enable a user of the microfluidic dispenser to provide the various user inputs relating to the limiting dilution. For example, the user input related to the limiting dilution can include a cell concentration, a substrate type, a cell dispersion level, a cell type or size, a pattern of dispense, a number of substrates that are to receive the fluid, or a combination thereof. Further, the processor can calculate a dispense volume 136 of a fluid for the limiting dilution based on the user input. In other words, based on the cell concentration, substrate type, cell dispersion level, etc., the processor can calculate the dispense volume of the fluid for the limiting dilution. The calculated dispense volume of the fluid can be associated with an increased likelihood of achieving a one-cell dispense for the limiting dilution. In other words, accounting for the cell concentration, substrate type, cell dispersion level, etc., when calculating the dispense volume of the fluid can increase the likelihood of achieving the one-cell dispense for the limiting dilution.

In one example, the microfluidic dispense head(s) 106 can dispense the fluid in accordance with the calculated dispense volume 136 from the fluid reservoir 124 via an ejection nozzle 108 of the microfluidic dispense head. The microfluidic dispense head can dispense the fluid to a substrate, such as the well plate 116 that includes the numerous wells 114. Alternatively, the microfluidic dispense head can dispense the fluid to a microscope slide. In one example, the fluid dispensed from the microfluidic dispense head can travel from the fluid reservoir through the dispense chamber 126 of the microfluidic dispense head and can exit through the ejection nozzle(s) located at an end of the dispense chamber. More specifically, in one example, the dispense chamber can include the resistive heating element 120, which can receive a current and cause the fluid to be ejected out of the dispense chamber through the ejection nozzle. In addition, the fluid reservoir can receive a cell-containing fluid sample from an operator, and the dispensed fluid can be taken from the cell-containing fluid sample.

In one example, the cell concentration indicated via the user interface 110 can impact the dispense volume 136 of the fluid for the limiting dilution. For example, the dispense volume can be correlated to a number of drops to fire from the ejection nozzle(s) 108 and a drop volume. The number of drops to fire from the ejection nozzle can be based on the drop volume and the cell concentration with respect to a cell solution. Thus, knowledge of the cell concentration can enable controller 128 to accurately calculate the dispense volume for the limiting dilution.

In one example, the microfluidic dispense head(s) 106 can include multiple ejection nozzles 108 that operate non-simultaneously to dispense the fluid onto the substrate. In another example, the microfluidic dispense head can include multiple microfluidic channels 122 (or paths), and a given microfluidic channel can have size dimensions based on a cell size used to perform the limiting dilution. The cell size can be one of the user inputs 134 received via the user interface 110. Therefore, controller 128 can instruct the microfluidic dispense head to dispense fluid in accordance with the calculated dispense volume 136 through the microfluidic channel having the size dimension that corresponds to the cell size used to perform the limiting dilution. As non-limiting examples, the size dimension can be 12 μm, 14 μm, 16 μm or 20 μm.

In one example, the cell dispersion level indicated via the user interface 110 can impact the dispense volume 136 for the limiting dilution. For example, the cell dispersion level, or an amount of cell clumpiness or dispersion, can play an increased role in an amount of wells of the substrate containing one single cell. When the cell dispersion level provided by the user is greater than a defined threshold, the controller 138 can instruct the microfluidic dispense head to dispense an increased volume of cell-containing fluid, as an aim can be for more than one cell per well of the substrate. The increase in the volume of the cell-containing fluid can depend on an amount that the cell dispersion level exceeds the defined threshold. For example, the increase in the volume of the cell-containing fluid can be greater when the cell dispersion level significantly exceeds the defined threshold as compared to minimally exceeding the defined threshold.

In one example, limiting dilution can follow a Poisson distribution, where there is about a 37% likelihood of dispensing a single cell in an aliquot when performing limiting dilution. However, the chance of obtaining the about 37% likelihood is difficult. Therefore, by calculating the dispense volume 136 for the fluid using the cell concentration, substrate type, cell dispersion level, cell type or size, pattern of dispense and/or number of substrates that are to receive the fluid, the chance of obtaining the 37% likelihood of successfully performing the single cell dispense is increased.

Figure 3:
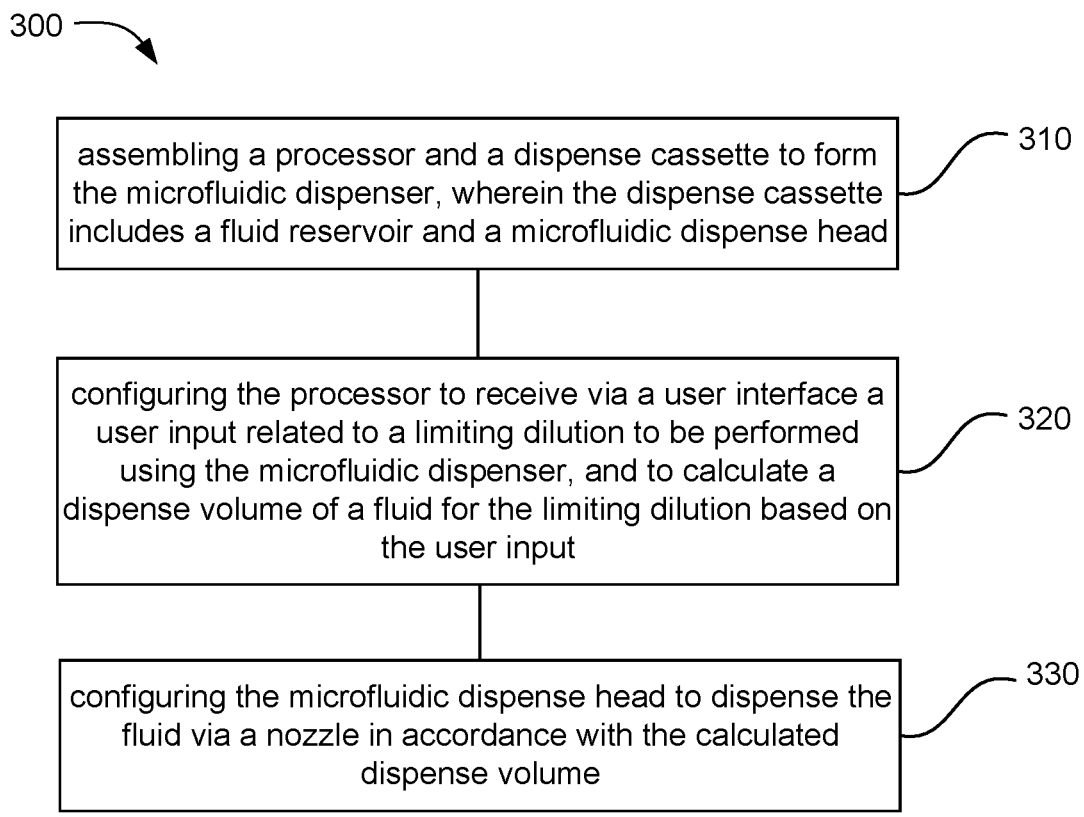
FIG. 3 is a flowchart illustrating an example method of making a microfluidic dispenser in accordance with the present disclosure.

FIG. 3 is a flowchart illustrating one example method 300 of making a microfluidic dispenser. The method can include assembling 310 a processor and a dispense cassette to form the microfluidic dispenser. The dispense cassette includes a fluid reservoir and a microfluidic dispense head. The method further includes configuring 320 the processor to receive via a user interface a user input related to limiting dilution to be performed using the microfluidic dispenser, and to calculate a dispense volume of a fluid for the limiting dilution based on the user input. The method also includes configuring 330 the microfluidic dispense head to dispense the fluid via a nozzle in accordance with the calculated dispense volume. In one example, the fluid can be a cell-containing fluid dispersion and the calculated dispense volume of the fluid can be associated with an increased likelihood of achieving a one-cell dispense for the limiting dilution. In another example, the fluid can be a cell-containing fluid dispersion and the user input related to the limiting dilution can include a cell concentration, a substrate type to receive the fluid from the microfluidic dispense head, a cell dispersion level, a cell type or size, a pattern of dispense, a number of substrates that are to receive the fluid from the microfluidic dispense head, or a combination thereof.

Figure 4:
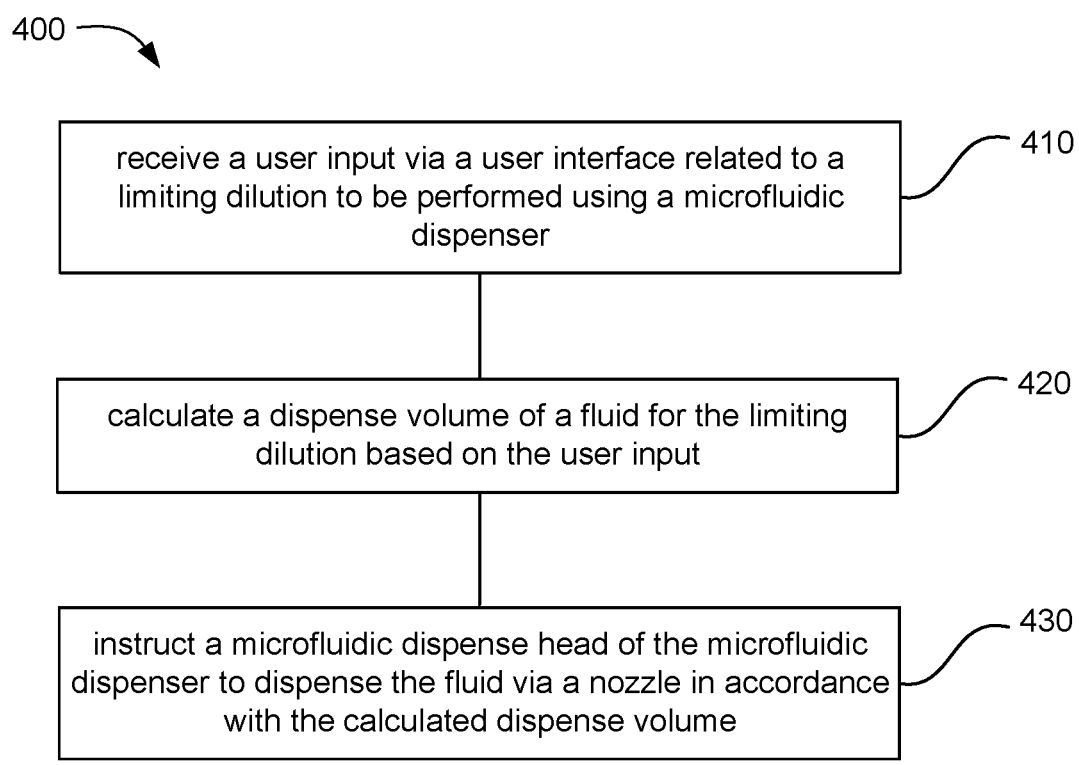
FIG. 4 is a flowchart illustrating an example method of calculating a dispense volume of a fluid for limiting dilution based on a user input and instructing the fluid to be dispensed in accordance with the calculated dispense volume in accordance with the present disclosure.

FIG. 4 is a flowchart illustrating one example method 400 of calculating a dispense volume of a fluid for limiting dilution based on a user input and instructing the fluid to be dispensed in accordance with the calculated dispense volume. The method can be executed as instructions on a machine, where the instructions can be included on a non-transitory machine readable storage medium. The instructions can be to receive 410 a user input via a user interface related to limiting dilution to be performed using a microfluidic dispenser, calculate 420 a dispense volume of a fluid for the limiting dilution based on the user input, and instruct 430 a microfluidic dispense head of the microfluidic dispenser to dispense the fluid via a nozzle in accordance with the calculated dispense volume. In one example, the fluid can be a cell-containing fluid dispersion, and the calculated dispense volume of the fluid can be associated with an increased likelihood of achieving a one-cell dispense for the limiting dilution. In another example, the fluid can be a cell-containing fluid dispersion, and the user input related to the limiting dilution can include a cell concentration, a substrate type to receive the fluid from the microfluidic dispense head, a cell dispersion level, a cell type or size, a pattern of dispense, a number of substrates that are to receive the fluid from the microfluidic dispense head, or a combination thereof.

While the flowcharts presented for this disclosure can imply a specific order of execution, the order of execution can differ from what is illustrated. For example, the order of two or more blocks can be rearranged relative to the order shown. Further, two or more blocks shown in succession can be executed in parallel or with partial parallelization. In some configurations, block(s) shown in the flow chart can be omitted or skipped. A number of counters, state variables, warning semaphores, or messages can be added to the logical flow for purposes of enhanced utility, accounting, performance, measurement, troubleshooting or for similar reasons.

Although the subject matter has been described in language specific to structural features and/or operations, it is to be understood that the subject matter defined in the appended claims is not limited to the specific features and operations described above. Rather, the specific features and acts described above are disclosed as example forms of implementing the claims. Numerous modifications and alternative arrangements can be devised without departing from the scope of the described disclosure.

It is noted that, as used in this specification and the appended claims, the singular forms "a," "an," and "the" include plural referents unless the context clearly dictates otherwise. For example, in referring to "a nozzle," this includes a single nozzle, but could also be multiple nozzles, depending on the fluid volume to be dispensed relative to the drop volume size ejectable from individual nozzles.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if individual numerical values and sub-ranges are explicitly recited. As an illustration, a numerical range of "about 1 wt % to about 20 wt %" should be interpreted to include the explicitly recited values of about 1 wt % to about 20 wt %, and also to include individual values and sub-ranges within the indicated range. Thus, included in this numerical range are individual values such as 2, 3.5, 10, 15, and sub-ranges such as from 1-10, from 2-15, and from 10-20, etc. This same principle applies to ranges reciting a single numerical value. Furthermore, such an interpretation should apply regardless of the breadth of the range or the characteristics being described.

The following illustrates an example of the present disclosure. However, it is to be understood that the following is merely illustrative of the application of an example of the present disclosure. Numerous modifications and alternative devices, methods, and systems may be devised without departing from the spirit and scope of the present disclosure. The appended claims are intended to cover such modifications and arrangements.

Example

To evaluate the microfluidic dispensers, systems, and methods of the present disclosure, a number of drops (at 1 nL aliquots) were to be dispensed from cell-containing dispersion fluid containing about 1000 cell per microliter (cells/µL) concentration. The drops were to be ejected in a grid dispense pattern on a microscope slide. The cell-containing fluid dispersion was verified to have a concentration of about 1000 cells/µL using automated cell counter. In this example, using the limiting dilution systems and methods described herein, a single cell was dispensed in 30% of the individual droplets.

Limiting dilution techniques can lead to a theoretical Poisson distribution of about a 37% chance of dispensing a single cell in an aliquot when performing limiting dilution. Thus, achieving a value close to 37% in a real world example would be valuable, as the 37% probability of obtaining a single cell in a single droplet of fluid assumes little to no variability of the biological samples and other factors that normally occur in real examples. Achieving 30%, which is close to the theoretical 37% that is possible under ideal conditions, is considered to be a positive result, as with the systems and methods descried herein, a single cell can be dispensed in a single droplet at greater than 80% of the theoretical value. This confirmed that the systems and methods described herein can be effective in dispensing a single cell with good reliability a large percentage of the time with good predictability, even when using a small quantity of the cell-containing fluid dispersion.

What is claimed is:

1. A microfluidic dispenser for single cell isolation, comprising:
a processor to:
receive a user input via a user interface related to cell concentration and substrate parameters for isolation of individual cells,
calculate a dispense volume of a cell-containing fluid based on the user input, wherein the calculated dispense volume is configured to achieve approximately one cell per dispense event; and
a dispense cassette including:
a fluid reservoir configured to hold the cell-containing fluid, and
a microfluidic dispense head to dispense the cell-containing fluid via a plurality of nozzles in accordance with the calculated dispense volume.

2. The microfluidic dispenser of claim 1, wherein the dispense volume calculated for the cell-containing fluid is associated with achieving one cell in the dispense volume.

3. The microfluidic dispenser of claim 1, wherein the cell concentration and substrate parameters include a cell concentration, a substrate type to receive the cell-containing fluid from the dispense cassette, a cell dispersion level, a cell type or size, a dispense pattern, a number of substrates that are to receive the cell-containing fluid from the dispense cassette, or a combination thereof.

4. The microfluidic dispenser of claim 1, wherein the fluid travels from the fluid reservoir through a microfluidic path and exits through the plurality of nozzles located at an end of the microfluidic path.

5. The microfluidic dispenser of claim 4, wherein the microfluidic path includes a resistive heating element or a piezo element that receives a current and causes the fluid to be ejected out of the chamber through the plurality of nozzles.

6. The microfluidic dispenser of claim 1, wherein the microfluidic dispense head includes multiple microfluidic paths, and a given microfluidic path in the multiple microfluidic paths has size dimensions based on a cell size of the cells to be isolated.

7. The microfluidic dispenser of claim 1, wherein the microfluidic dispenser further comprises a substrate to receive the fluid from the plurality of nozzles.

8. The microfluidic dispenser of claim 7, wherein the substrate includes a well-plate, a microscope slide, agar, hydrogel, a petri dish, nitrocellulose, or polydimethylsiloxane.

9. A method of making a microfluidic dispenser for single cell isolation, comprising:
 assembling a processor and a dispense cassette to form the microfluidic dispenser, wherein the dispense cassette includes a fluid reservoir and a microfluidic dispense head;
 configuring the processor to receive via a user interface a user input related to cell concentration and substrate parameters for isolation of individual cells, and to calculate a dispense volume of a cell-containing fluid based on the user input, wherein the calculated dispense volume is configured to achieve approximately one cell per dispense event; and
configuring the microfluidic dispense head to dispense the cell-containing fluid via a plurality of nozzles in accordance with the calculated dispense volume.

10. The method of claim 9, wherein the calculated dispense volume of the cell-containing fluid is associated with achieving one cell per dispense event.

11. The method of claim 9, wherein the cell concentration and substrate parameters include a cell concentration, a substrate type to receive the cell-containing fluid from the microfluidic dispense head, a cell dispersion level, a cell type or size, a pattern of dispense, a number of substrates that are to receive the cell-containing fluid from the microfluidic dispense head, or a combination thereof.

12. A machine readable storage medium comprising instructions that, when executed by a processor, cause the processor to:
 receive a user input via a user interface related to cell concentration and substrate parameters for isolation of individual cells;
 calculate a dispense volume of a cell-containing fluid based on the user input, wherein the calculated dispense volume is configured to achieve approximately one cell per dispense event; and
 instruct a microfluidic dispense head of the microfluidic dispenser to dispense the cell-containing fluid via a plurality of nozzles in accordance with the calculated dispense volume.

13. The machine readable storage medium of claim 12, wherein the calculated dispense volume of the cell-containing fluid is associated with achieving one cell per dispense event.

14. The machine readable storage medium of claim 12, wherein the cell concentration and substrate parameters include a cell concentration, a substrate type to receive the cell-containing fluid from the microfluidic dispense head, a cell dispersion level, a cell type or size, a pattern of dispense, a number of substrates that are to receive the cell-containing fluid from the microfluidic dispense head, or a combination thereof.

* * * * *